Aug. 31, 1965 W. L. KURIGER 3,204,175
AUTOMATIC SELF-STARTING VOLTAGE REGULATING DEVICE
Filed Sept. 25, 1961
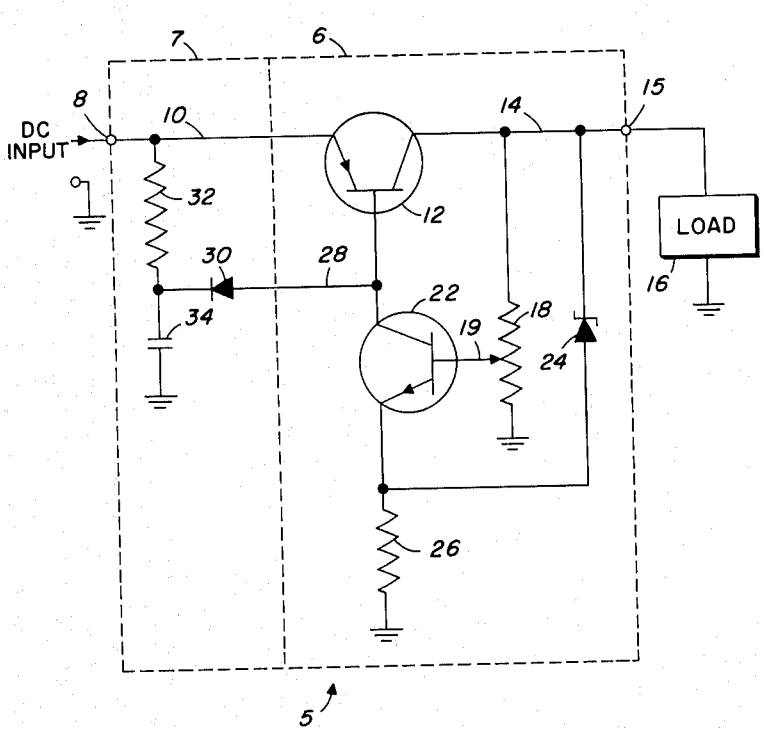
INVENTOR.
WILLIAM L. KURIGER
BY Moody and Harris
ATTORNEYS

United States Patent Office 3,204,175
Patented Aug. 31, 1965

3,204,175
AUTOMATIC SELF-STARTING VOLTAGE REGULATING DEVICE
William L. Kuriger, Cedar Rapids, Iowa, assignor to Collins Radio Company, Cedar Rapids, Iowa, a corporation of Iowa
Filed Sept. 25, 1961, Ser. No. 140,428
3 Claims. (Cl. 323—22)

This invention relates to a voltage regulating device and more particularly to a voltage regulating device including an improved automatic self-starting network.

As is well known in the art, a common type of voltage regulator includes bias control means for sampling the output voltage and varying the bias on the power amplifier to maintain the output voltage at a predetermined value. Such a voltage regulating device might also be utilized to protect the power amplifier against short circuits in the output load by immediately rendering the power amplifier inoperative in response to such a short circuit. With the advent of the transistorized voltage regulator, the need for such a protective device has, in fact, become more acute since a transistor is generally more easily damaged due to excessive conduction than is a vacuum tube.

It is common for voltage regulating devices of the type abovementioned, and particularly those including a short circuit protector, to require means for starting the regulator each time that the unregulated input voltage is applied. In other words, it is necessary to provide additional means for overcoming the inoperative state of the power transistor since the bias control means of this type of regulator depends upon an output signal from the power transistor itself to develop the proper bias for changing the state of said power transistor from inoperative to operative. Obviously, mere application of input voltage to such a device is not enough, of itself, to overcome this block and cause starting, or resumption, of normal regulator operation.

While means for starting voltage regulating devices have been known and utilized heretofore, all have been necessarily complicated and therefore less dependable, or created other problems in solving the starting problem, such as, for example, coupling hum through the regulator where a capacitor is permanently connected directly to the base of the power transistor to provide self-starting.

It is therefore an object of this invention to provide an improved voltage regulating device having an automatic self-starting network that is simple yet dependable.

It is another object of this invention to provide a voltage regulating device having a self-starting network that is responsive only to the first surge of applied power from an unregulated source and is thereafter effectively automatically electrically disconnected from the circuit.

More particularly, it is an object of this invention to provide a voltage regulating device having a self-starting network which includes a capacitor and a diode, one side of which diode is connected to the base of the power transistor and the other side of which diode is connected to said capacitor whereby the first surge of applied unregulated voltage is coupled through said power amplifier causing an output voltage to be produced to bias said power amplifier into continued conduction unless a short circuit is present, and whereby the charging of said capacitor biases said diode to cutoff after said first surge of power to thereafter effectively electrically disconnect said capacitor from said power amplifier.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawing illustrates one complete example of the embodiment of the invention constructed according to the best mode so far devised for the practical application of the principles thereof, and in which the single figure shown is a schematic diagram of said embodiment.

Referring now to the drawings, the numeral 5 indicates generally the device of this invention, which device has a regulating section 6, which in this case serves also as a short circuit protector, and an automatic self-starting section 7.

Power from an unregulated D.C. source (not shown) may be coupled through input terminal 8 and lead 10 directly to the emitter of PNP type power transistor 12 in voltage regulating section 6. As is well known in the art, regulated direct voltage may be coupled from the collector of transistor 12 by proper control of the bias impressed upon the base of said transistor, the regulated direct voltage being coupled by means of lead 14 to output terminal 15 which output terminal may be connected to an external output load 16. As shown in the figure, a return path to the unregulated source (not shown) is provided by ground whenever necessary.

Proper control of the bias impressed upon the base of transistor 12 is obtained by sampling the regulated output by means of a variable resistor 18 connected between the collector of transistor 12 and ground, the variable arm 19 of said resistor being connected directly to the base of NPN type transistor 22. A reference voltage is obtained by connecting the emitter of transistor 22 to the collector of transistor 12 through a Zener, or breakdown junction, diode 24, and to ground through a resistor 26. The collector of transistor 22 is connected directly to the base of transistor 12.

The base of transistor 12 is also connected, by means of a lead 28, to the anode of diode 30, which diode is a part of automatic self-starting section 6. The cathode of diode 30 is connected through a resistor 32 to input terminal 8 and through capacitor 34 to ground.

During normal operation, the voltage regulator shown in the figure samples the output voltage from the collector of transistor 12 through the bridge arrangement including resistor 18, Zener diode 24 and resistor 26 to bias transistor 22, which, in turn, controls the bias of transistor 12 to maintain a constant output. This type of regulation is well known in the art and a more detailed explanation of a regulator operating in a similar manner may be obtained by referring to United States Patent Number 2,896,151, for example.

As can be seen from the figure, if a short circuit should be connected in load 16, the voltage drop across the bias control bridge arrangement will be virtually zero. This, of course, immediately cuts off transistor 22, which, in turn, renders transistor 12 inoperative.

Since transistor 22 depends upon collector voltage from transistor 12 for operational bias voltage, and since transistor 12 depends upon conduction of transistor 22 to complete the base circuit, a starting network must be provided to allow transistor 22 to begin conduction when input power is coupled to the device. Such a starting circuit would, of course, also be necessary to resume normal operation after a short circuit since a short circuit acts to render the regulator inoperative, as brought out hereinabove. Such a starting network is provided by this invention.

When the unregulated input voltage is coupled to the device (after a short circuit the input power must be removed and then reapplied to start the device), the first surge of power will be conducted through the emitter-base circuit of transistor 12 and through diode 30 to charge capacitor 34 since transistor 22 is in an inoperative state. This surge of power through the emitter-base circuit of transistor 12 will produce an output voltage through the base-collector circuit, a part of which voltage is dropped across the bias control bridge arrangement to develop the necessary bias to render transistor 22 conductive, unless, of course, there is a short circuit in the output load.

Capacitor 34 will, as above stated, charge through diode 30, but only until the diode is back biased after which the diode is maintained at the unregulated input voltage through resistor 32 to assure constant back biasing thereafter, this, in effect, automatically electrically disconnecting the starting section from the regulating and protective section during normal operation.

A working embodiment of the automatic self-starting voltage regulating and short circuit protection device of this invention is as follows:

| Component Number | Component | Value or Designation |
|---|---|---|
| 12 | PNP Type Transistor | 2N1131. |
| 18 | Variable Resistor | 0–2,500 ohms. |
| 22 | NPN Type Transistor | 2N697. |
| 24 | Breakdown junction diode | 16 volt Zener. |
| 26 | Resistor | 150 ohms. |
| 30 | Diode | 1N457. |
| 32 | Resistor | 1,000 ohms. |
| 34 | Capacitor | 4.7 μ fd. |

It is to be realized, of course, that the foregoing list is meant to be merely illustrative of one particular embodiment of this invention and that changes, as would be evident to one skilled in the art, might be made without departing from the scope of this invention.

In view of the foregoing, it should be evident to those skilled in the art that the automatic self-starting voltage regultaing device of this invention provides an improved and heretofore unavailable device that is simple yet well suited for its intended use.

What is claimed as my invention is:

1. An automatic self-starting voltage regulating device, comprising: input terminal means adapted to be connected to a source of unregulated D.C. power; output terminal means for coupling output D.C. power from said device; power amplifier means having an input electrode connected with said input terminal means, an output electrode connected with said output terminal means, and a control electrode; control means connected to said control electrode and responsive to output D.C. power produced by said device for varying the applied bias to said control electrode during normal operation to thereby maintain the output D.C. power coupled from said output terminal means at a substantially constant predetermined value; and network means connected with said power amplifier means and responsive to application of unregulated input power thereto to cause said power amplifier means to be conductive for a predetermined short period of time prior to said normal operation whereby output D.C. power is produced by said device to automatically start the same, said network means including a capacitor and resistor serially connected across said input terminal means, and wherein said electron control device is a diode the anode of which is connected to the control electrode of said power amplifier means and the cathode of which is connected to the junction of said resistor and capacitor whereby applied unregulated voltage is coupled through said diode during said predetermined short period of time to charge said capacitor, said capacitor being maintained charged through said resistor to bias said diode to cutoff after said predetermined short period of time.

2. An automatic self-starting voltage regulating and short circuit protective device, comprising: input terminal means adapted to be connected to a source of unregulated D.C. power; output terminal means adapted to be connected to an output load; power amplifier means having an input electrode connected with said input terminal means, an output electrode connected with said output terminal means, and a control electrode; control means connected to said control electrode for varying the applied bias thereto during normal operation of said device so that regulated D.C. power is coupled from said output terminal means, said control means rendering said power amplifier means inoperative whenever a short circuit is connected to said output terminal means and thereafter influencing said power amplifier means to remain in a nonconductive state until output power is coupled to said output terminal means in the absence of a short circuit connected thereto; and automatic self-starting network means connected with said power amplifier means and responsive to application of unregulated D.C. power to said power amplifier to cause said power amplifier means to be conductive for a predetermined short period of time to thereby couple output power to said output terminal means during said short period of time, said network means including a diode to automatically effectively electrically disconnect said network means from said power amplifier after said predetermined short period of time.

3. A self-starting voltage regulating device of the type having a transistor power amplifier the input electrode of which receives unregulated D.C. power and the output electrode of which supplies output D.C. power, said output power being regulated by bias control means which samples said output power and varies the bias applied to the control electrode of said transistor power amplifier, said bias control means depending upon output power from said output electrode to develop said bias applied to said control electrode, said device being characterized by an automatic self-starting network having a resistor one side of which is connected to the input electrode of said transistor power amplifier, a capacitor one end of which is connected to the other end of said resistor and the other end of which is connected to ground, and a diode one end of which is connected to the control electrode of said transistor power amplifier and the other end of which is connected to said one end of said capacitor, said network being responsive to the first surge of received unregulated power to permit said capacitor to be charged through said diode and output D.C. power to be produced from said output electrode, said diode being biased to cutoff by said resistor and capacitor after said first surge of received unregulated power.

References Cited by the Examiner

UNITED STATES PATENTS

| | | | |
|---|---|---|---|
| 2,751,549 | 6/56 | Chase | 323—66 |
| 2,837,651 | 6/58 | Schultz | 331—113.1 |
| 2,922,945 | 1/60 | Norris | 323—22 |
| 2,963,637 | 12/60 | Osborn | 323—22 |
| 2,973,456 | 2/61 | Smyth | 307—88.5 |
| 3,026,469 | 3/62 | Wilbur | 323—22 |
| 3,122,697 | 2/64 | Kauders | 323—22 |

LLOYD McCOLLUM, *Primary Examiner.*